United States Patent [19]
Lyons et al.

[11] Patent Number: 6,101,195
[45] Date of Patent: Aug. 8, 2000

[54] TIMING CORRECTION METHOD AND APPARATUS

[75] Inventors: Paul Wallace Lyons, New Egypt; John Prickett Beltz, Willingboro, both of N.J.; Alfonse Anthony Acampora, Staten Island, N.Y.

[73] Assignee: Sarnoff Corporation, Princeton, N.J.

[21] Appl. No.: 08/864,326

[22] Filed: May 28, 1997

[51] Int. Cl.[7] ....................................... H04J 3/00
[52] U.S. Cl. ........................ 370/498; 370/498; 348/512
[58] Field of Search ................... 375/316, 354, 375/355, 377, 372; 370/389, 407, 468, 498; 348/512, 513

[56] References Cited

U.S. PATENT DOCUMENTS

| | | | |
|---|---|---|---|
| 5,535,216 | 7/1996 | Goldman et al. | 375/354 |
| 5,565,923 | 10/1996 | Zdepski | 348/423 |
| 5,588,025 | 12/1996 | Strolle et al. | 375/316 |
| 5,596,420 | 1/1997 | Daum | 386/110 |
| 5,602,595 | 2/1997 | Citta et al. | 348/495 |
| 5,703,877 | 12/1997 | Nuber et al. | 370/395 |
| 5,742,623 | 4/1998 | Nuber et al. | 371/47.1 |
| 5,856,973 | 1/1999 | Thompson | 370/389 |
| 5,892,535 | 4/1999 | Allen et al. | 348/9 |
| 5,984,512 | 11/1999 | Jones et al. | 364/514 |

OTHER PUBLICATIONS

EP 0 668 697 A (Matsushita Electric Ind Co Ltd) Aug. 23, 1995.

Weiss S M: "Switching Facilities In MPEG–2: Necessary But Not Sufficient" SMPTE Journal vol. 104, No. 12, Dec. 1, 1995.

*Primary Examiner*—Chi H. Pham
*Assistant Examiner*—Emmanuel Bayard
*Attorney, Agent, or Firm*—William J. Burke

[57] ABSTRACT

An apparatus and method for receiving an information stream comprising a plurality of timing portions and associated payload portions, decoding each timing portion, determining a duration parameter of a payload portion associated with the decoded timing portion, and recoding the timing portion using the duration parameter and a local reference time parameter.

21 Claims, 6 Drawing Sheets

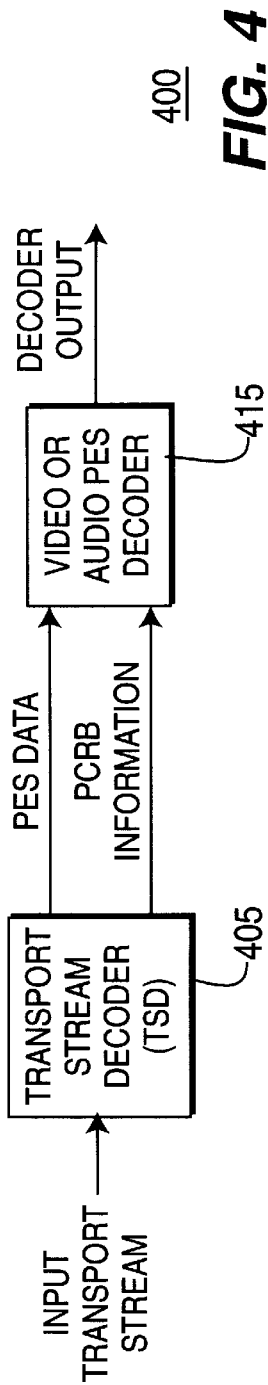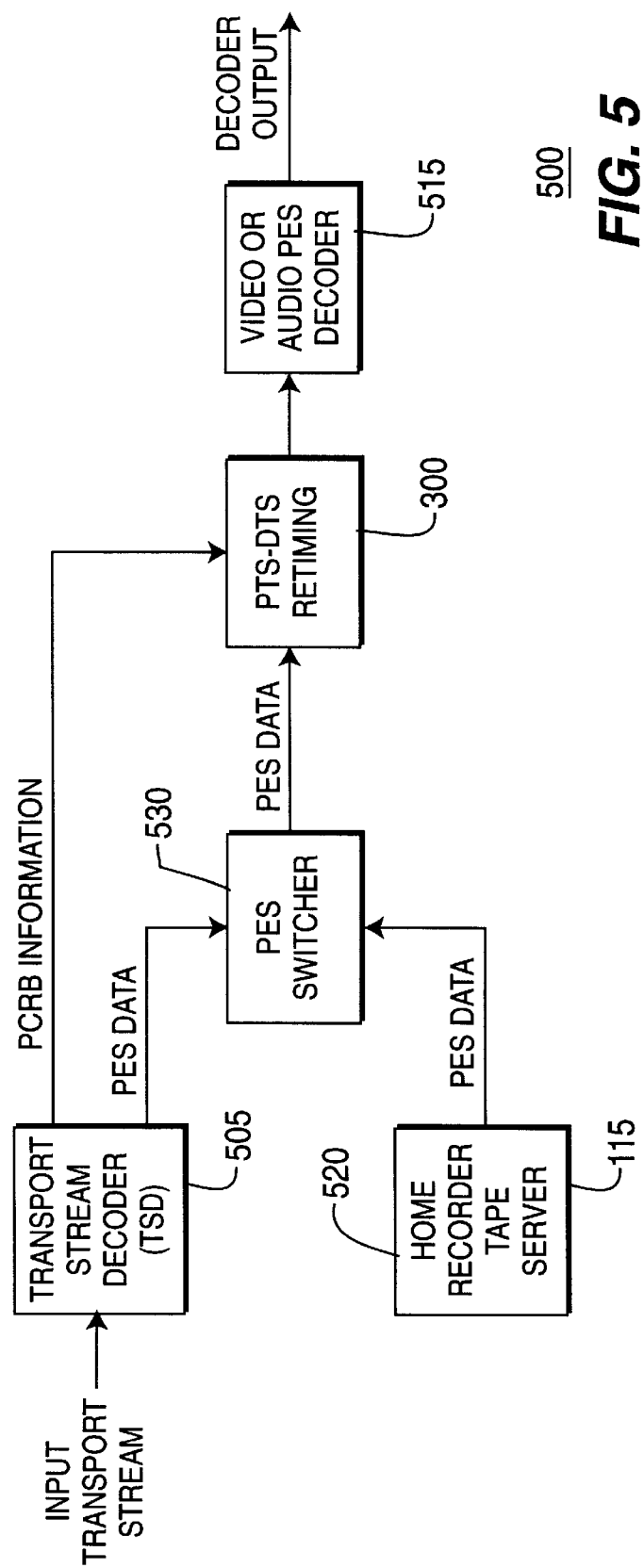

TIMING CORRECTION METHOD AND APPARATUS

This application is related to U.S. patent application Ser. No. 08/864,325, filed on the same date as the present application.

This invention was made with U.S. government support under contract number. 70 NANB5H1174. The U.S. Government has certain rights in this invention.

The invention relates to communication systems in general, and more particularly, the invention relates to a method and apparatus for retiming packetized information including timing information.

BACKGROUND OF THE DISCLOSURE

Synchronization of a decoding and presentation process for received bitstreams is a particularly important aspect of real-time digital data delivery systems such as digital television systems. For example, the Moving Pictures Experts Group (MPEG) has promulgated several standards relating to digital data delivery systems. The first, known as MPEG-1 refers to ISO/IEC standards 11172, incorporated herein by reference. The second, known as MPEG-2, refers to ISO/IEC standards 13818, incorporated herein by reference. A compressed digital video system is described in the Advanced Television Systems Committee (ATSC) digital television standard document A/53, incorporated herein by reference. Because received data is expected to be processed at a particular rate (to match the rate at which it is generated and transmitted), loss of synchronization leads to either buffer overflow or underflow at the decoder, and as a consequence, loss of presentation and/or displaced synchronization.

There are many instances where there is a need to switch from one encoded or compressed bitstream to another. When switching between bitstreams it is important to accurately preserve the timing information. For example, a TV studio can switch from an ATSC bitstream stored on a server to another server-stored bitstream. Studio switching can also occur between an active encoder (live camera) and a server (e.g., inserting commercials into a program stream), or between a studio program stream and remote feed. Home receivers can switch to a program bitstream to a bitstream from a tape player/recorder. Bitstream generators, used for compliance or other tests, usually loop a bitstream endlessly. This is a form of splicing, i.e., joining of the end of the bitstream to the beginning of the bit-stream.

When switching from one compressed ATSC video bitstream to another, appropriate measures must be taken in the transmission order of the picture bitstream to assure proper subsequent presentation of the decoded pictures, without time gaps. To provide a smooth transition of program video and audio decoding and presentation, the presentation time stamp (PMS) and the decode time stamp (DTS) must be retimed if the transport stream included PES streams.

Prior art retiming systems include a 27 MHz (local) station clock which is utilized by a local PCR and PCRB generator. A multiplexed transport stream is received and the PTS, DTS and PCR timing information is detected and replaced by locally generated PTS, DTS and PCR timing information to produce a retimed transport stream. The transport streams comprising the multiplexed transport stream are constant bitrate data streams and the resultant transport stream is likewise a constant bitrate data stream. Thus, there is no occasion to insert opportunistic data since any additional data will necessarily change the bitrate of the stream. Another drawback is that the operation of the system can lead to an irregularly spaced PCR packet at the transition of the switching process (i.e., not ATSC compliant). Moreover, merely retiming the PTS and DTS is insufficient to insure proper buffer conditions at a far end subscriber decoder.

Therefore, a need exists in the art for a retiming method and apparatus which allows for the insertion of opportunistic data while maintaining timing compliance. It is also desirable to provide a retiming method and apparatus which insures proper buffer conditions at the far-end subscriber decoder.

SUMMARY OF THE INVENTION

The disadvantages heretofore associated with the prior art are overcome by the present invention of a retiming apparatus and method which receives an information streams, such as variable length packetized elementary streams, decodes the timing portions of the received streams using a local timing reference, calculates new timing information using the decoded timing information and timing information related to the local timing reference, and retimes the streams using the calculated timing information. The retimed streams are re-encoded to form a stream which, when decoded by a decoder, will reproduce the desired information without errors induced by timing discontinuities.

More specifically, the invention receives an information stream comprising a plurality of timing portions and associated payload portions, the timing portions being necessary for decoding said associated payload portions to produce a program at a decoder. The invention decodes each timing portion of the information stream, determines a duration parameter of a payload portion associated with the decoded timing portion and recodes the timing portion of said information stream using the duration parameter and a local reference time parameter.

BRIEF DESCRIPTION OF THE DRAWINGS

The teachings of the present invention can be readily understood by considering the following detailed description in conjunction with the accompanying drawings, in which:

FIG. 4 shows a block diagram of a receiver/decoder system;

FIG. 5 shows a block diagram of a home receiver/decoder system, such as the system shown in FIG. 4, and including improvements according to the invention;

To facilitate understanding, identical or similar reference numerals have been used, where possible, to designate identical or similar elements that are common to the figures.

DETAILED DESCRIPTION

Figure 1:
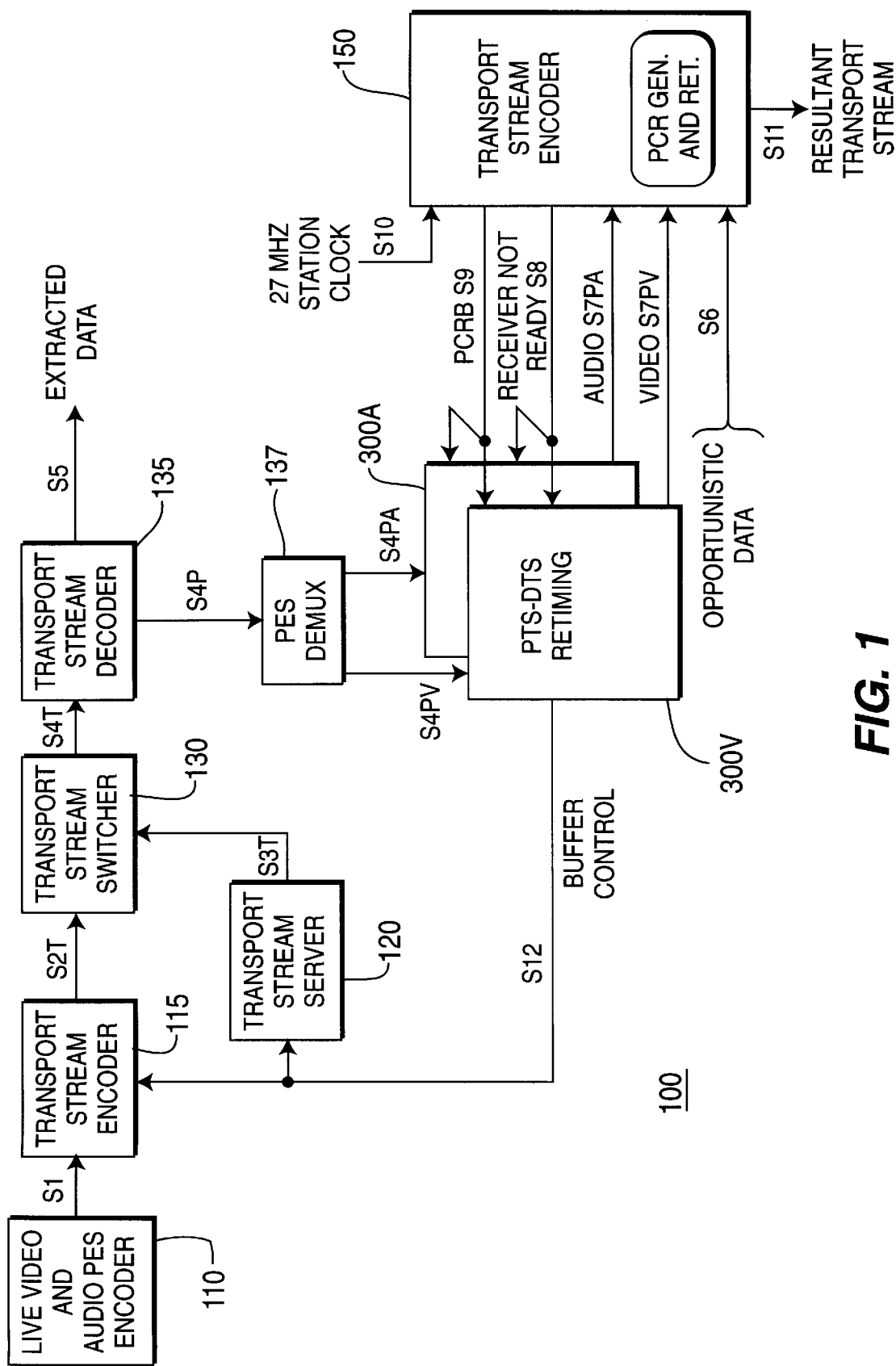
FIG. 1 shows a block diagram of a transport layer switching and retiming system according to the invention.

FIG. 1 shows a block diagram of a transport layer switching and retiming system 100 according to the invention. The system 100 is illustrated using a transport layer which is compliant with the ATSC digital television system and is useful in, e.g., a television studio or station environment. A live video and audio packetized elementary stream (PES) encoder 110 (e.g., a camera or remote audio/video feed) produces a packetized elementary stream S1 which is coupled to a transport stream encoder 115. Transport stream encoder 115 converts PES S1 into a first transport stream S2T which is coupled to a transport stream switcher 130. Transport stream switcher 130 receives a second transport stream S3T from a transport stream server 120 (e.g., a video disk). In response to a control signal (not shown), the transport stream switcher 130 selects one of the two transport streams S2T, S3T, and sends it as stream S4T to a transport stream decoder 135. It should be noted that the transport stream switcher 130 may include more than two input streams and that the input streams may come from a variety of sources, e.g., bitstream servers, active encoders (live camera) or remote feeds, bitstream generators or the like. As such, the input streams are not likely to share information such as program clock reference (PCR), presentation time stamp (PTS) and decode time stamp (DTS) timing information.

The transport stream decoder 135 decodes the selected S4T transport stream to produce a packetized elementary stream S4P. A PES demultiplexer 137 demultiplexes stream S4P, if necessary, to produce audio PES S4PA and video PES S4PV. The audio S4PA and video S4PV streams are coupled to, respectively, an audio PTS retiming unit 300A and a video PTS-DTS retiming unit 300V. Video retiming unit 300V decodes and retimes the old presentation time stamps (PTS) and decode time stamps (DTS) of the video stream using new timing information derived from a Program Clock Reference Base (PCRB) signal S9. Audio retiming unit 300A retimes the old PTS of the audio stream using new timing information derived from the PCRB signal S9.

Transport stream encoder (TSE) 150 receives the retimed audio S7PA and video S7PV PES streams and multiplexes these streams to produce an output transport stream S11. TSE 150 includes a PCR generator and retimer which receives a 27 MHz station clock signal S10 and creates PCR packets that are also multiplexed into the output transport stream S11. The PCR generator also produces a synchronized PCR base reference signal S9 at a 90 Khz rate (the station clock of 27 MHz divided by 300). The PCRB reference signal S9 is fed back to the retiming units 300A, 300V for use in the PTS and DTS stamping process.

In the retiming system 100 of FIG. 1, the selected transport stream S4T is decoded to the PES layer so that the PTS and DTS of the included PES streams can be over written with net relative time extracted from a delayed version of the PCRB. Decoding to the PES layer insures that the relationships between visual and aural presentations (i.e., "lip sync") are strictly adhered to. In this manner, a major aspect of seamless splicing is accomplished; namely, processing the PTS and DTS in the PES layer and the PCR in the Transport layer to accurately define these signals in the resultant bitstream S11.

The retiming system 100 of FIG. 1 also allows for data flow control to insure proper buffer management in the subscriber PES Decoder. By algorithmic methods (which are discussed later with respect to FIG. 3) the subscriber-side buffer occupancy can be determined and, if the buffer is too full, the retiming units 300A, 300V can reduce their bitrates (or delay delivery) and retime the audio S7PA and video S7PV PES streams to provide time for the subscriber-side buffers to unload. Additionally, the transport stream encoder 150 can issue a RECEIVER NOT READY (S8) signal to the retiming units 300A, 300V to halt delivery of streams S7PA and S7PV if the TSE buffers are full. Moreover, the retiming units 300A, 300V may generate a buffer control signal S12 which can be used to regulate the data production in the video/audio encoders (for live bitstreams) or the servers (for stored bitstreams). The buffer control signal S12 is depicted in FIG. 1 as being generated by the video PTS-DTS retiming unit 300V, though the signal may also be generated in, e.g., the audio PTS retiming unit 300A.

The demultiplexing of PES S4P and subsequent remultiplexing of the elementary streams S7PA and S7PV per the system 100 of FIG. 1 advantageously allows for either variable bitrate or a constant bitrate streams. In the former case, a data stream S5 (if available) can be extracted from the selected transport stream S4T by the transport stream decoder 135. The extracted data stream S5 may be, e.g., a private or subscriber data stream which is being included in the transport stream as an add-on service to the far-end subscriber. The extracted data stream S5 may also carry information useful to the television studio or station. The extracted data stream S5 may be manipulated by a data processing arrangement (not shown) and coupled to TSE 150 as part of an opportunistic data stream S6. The opportunistic data stream may also include other data streams (e.g., commercials, station identification, pay per view or subscriber verification codes, etc.). The opportunistic data stream S6 is encoded by TSE 150 and included in the output transport stream S11.

The demultiplexing of PES S4P and subsequent remultiplexing of the elementary streams S7PA and S7PV per the system 100 of FIG. 1 addresses another problem in the prior art arrangement; namely, the requirement of locking the byte clocks of the presently selected stream and the stream to be selected next to a single 27 MHz clock source. By decoding the incoming transport streams to the PES layer, the differential errors (i.e., tolerance limit to tolerance limit) are stripped away and the resultant transport stream S11 from TSE 150 is compliant with the timing requirements of the ATSC system. Moreover, by controlling the transport stream PCR stamping process, the ATSC requirement of sending a PCR reference packet every 100 mS may be consistently adhered to.

Figure 2:
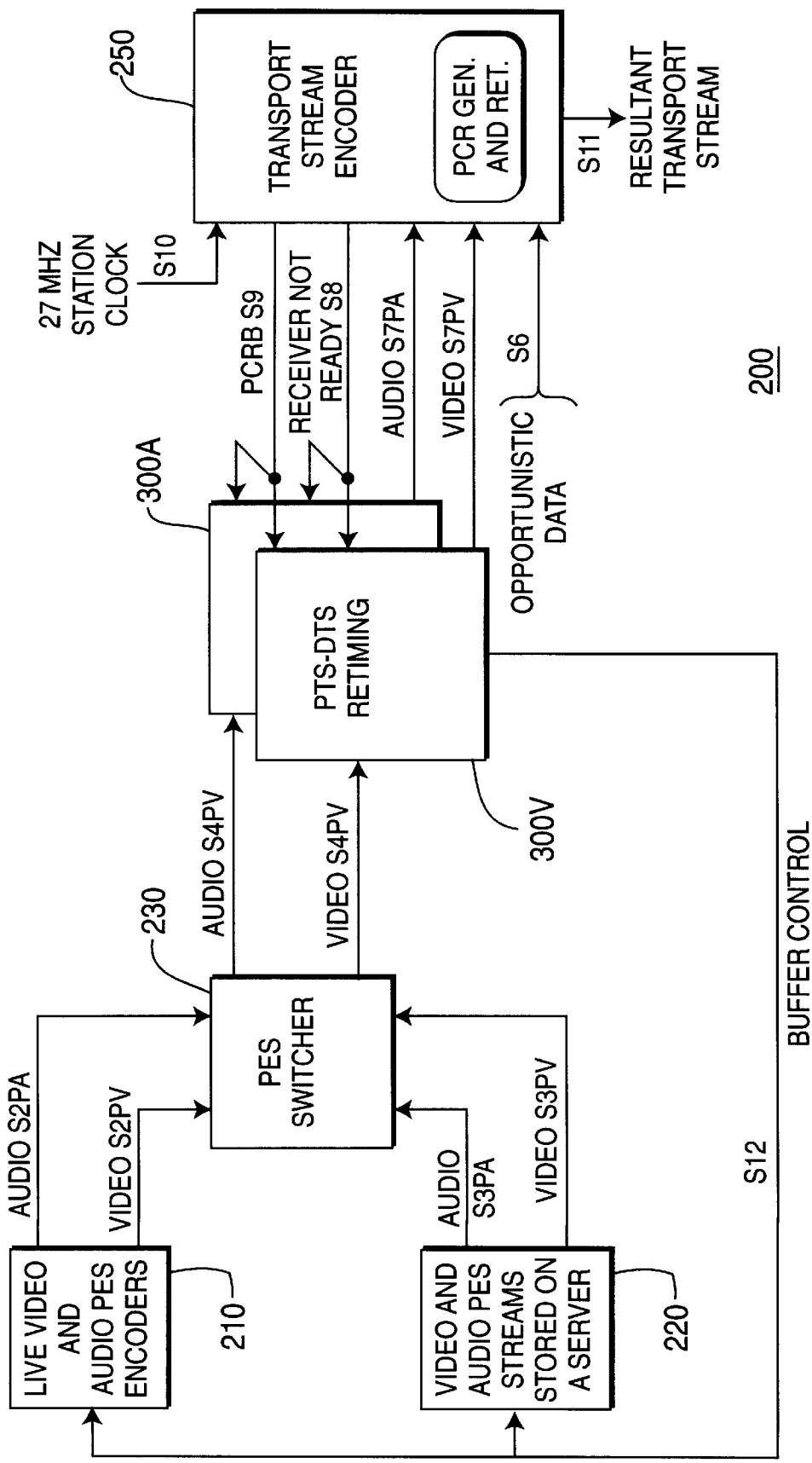
FIG. 2 shows a block diagram of a packetized elementary stream layer switching and retiming system according to the invention.

FIG. 2 shows a block diagram of a preferred PES layer switching and retiming system 200 according to the invention. The system 200 of FIG. 2 is illustrated using a PES layer which is compliant with the ATSC digital television system and is useful in, e.g., a television studio or station environment.

In the system 200 of FIG. 2 a live video and audio PES encoder 210 (e.g., a camera or remote audio/video feed) produces audio S2PA and video S2PV packetized elementary streams which are coupled to a PES switcher 230. PES switcher 230 also receives a second pair of audio S3PA and video S3PV packetized elementary streams from a PES server 220 (e.g., a video disk). In response to a control signal (not shown), the PES switcher 230 selects and couples one pair of audio S4PA and video S4PV packetized elementary streams to respective audio 300A and video 300V retiming units. The video PTS-DTS retiming unit 300V and audio PTS retiming unit 300A perform in substantially the same manner as previously described with respect to FIG. 1 and will be discussed in detail with respect to FIGS. 3 and 7. TSE 250 operates in substantially the same manner as previously described with respect to the TSE 150 in the system 100 of FIG. 1 and will not be discussed further.

The process for PTS and DTS retiming, and the interactions of this process with the TSE (i.e., for PCR insertion, PCRB generation, and data flow control using the stop feature) and the PES Encoders (for data flow control using the inherently contained buffers) are important aspects of the invention that will be discussed next.

Figure 3:
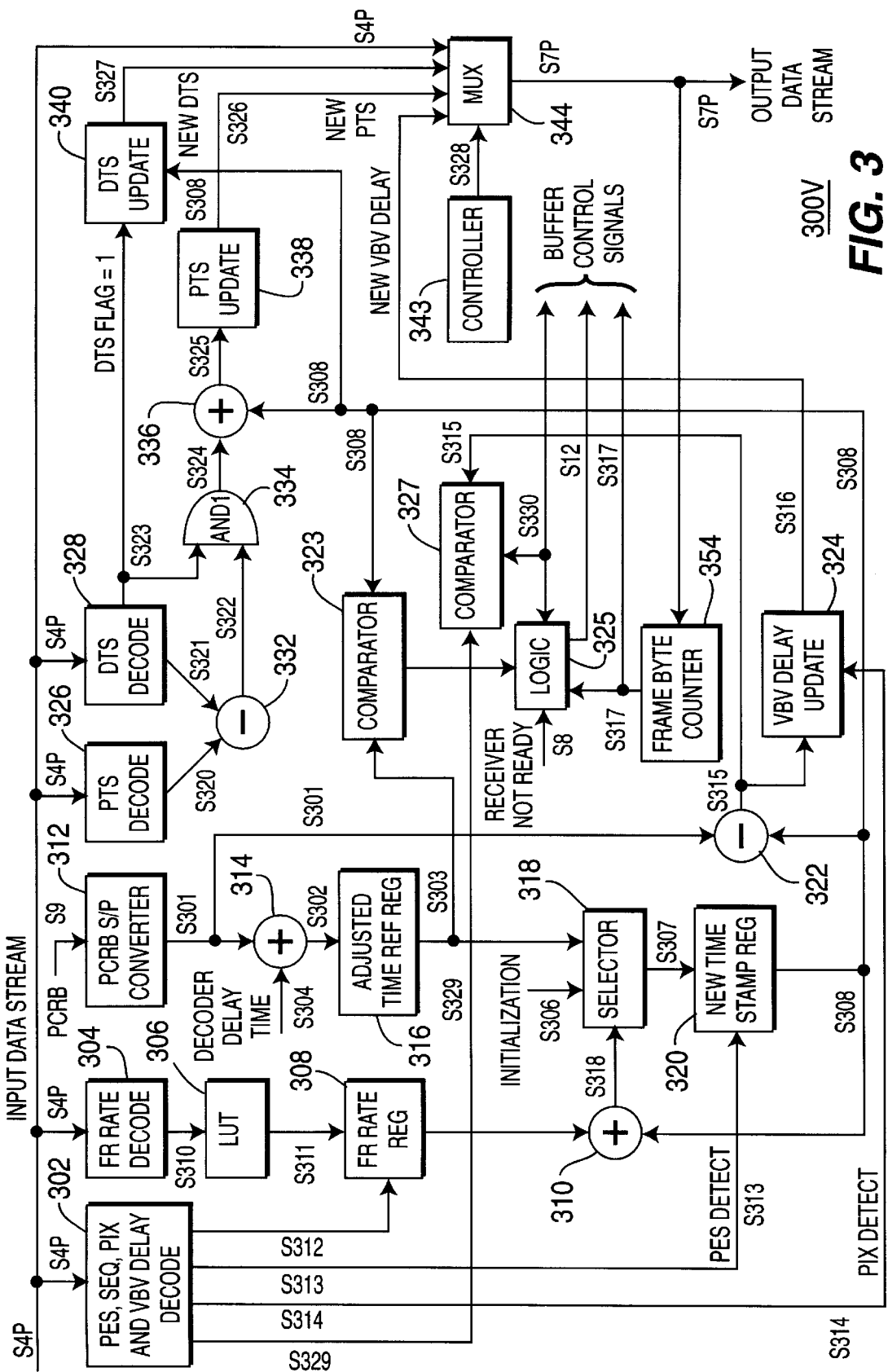
FIG. 3 shows a block diagram of a video PTS-DTS retiming system suitable for use in retiming systems of FIG. 1 and FIG. 2.

FIG. 3 shows a block diagram of a video PTS-DTS retiming system 300 suitable for use in the systems of FIGS. 1 and 2. An audio PTS retiming unit is discussed below with respect to FIG. 7. In general, the following description of the video retiming unit 300V is also applicable to similarly labeled portions of the audio retiming unit 300A. The PT-DTS retiming unit 300V receives a PES input bitstream S 4P from a PES switcher 230 (PES layer retiming system 200) or a PES demultiplexer 137 (transport layer retiming system 100) and delivers a PES output bitstream S7P to a TSE 150 in the studio or station case (other cases, such as the home recorder, will be covered subsequently). The TSE performs the PCR stamping at its output. The TSE feeds back a synchronized PCR base reference at a 90 KHz rate (the station clock of 27 MFHz divided by 300). The PTS-DTS retiming unit operates as follows.

PCRB serial to parallel converter 312 converts the PCRB signal S9 from TSE 150 into a parallel (byte) stream S301 which is coupled to an adder 314 and a subtractor 322. Adder 314 adds the parallel PCRB S301 to a decoder delay time S304 to produce an adjusted PCRB time reference S302 which is stored in an adjusted time reference register 316. The adjusted PCRB time reference S302 reflects the value of the PCRB count when a first picture may be removed from a video buffer and decoded at the far-end decoder.

The addition of a decoder delay time S304 provides a mechanism for achieving a particular video buffer fullness level in a decoder of the type which uses the DTS for buffer control. The additional delay time causes the decoder to maintain a desired level of buffer utilization, e.g., fill video buffer with a certain number of pictures (perhaps all of the pictures representing the end-to-end-delay). One or more of the following factors may be used to determine the decoder delay time S304; the header entries of the VBV buffer size, the VBV delay and frame rate, the number of bytes in a frame and the number of frames (i.e., a frame byte count) in the decoder buffer.

The method for using the delay time S304 to control the fullness of the decoder buffer is as follows. The adjusted PCRB is used as the DTS entry, as will be described shortly. When a video PES is present at the output of the video buffer at the decoder, the DTS (Decode Time Stamp) contained in the PES header is compared to the PCRB real-time clock reference derived from the PCR (Program Clock Reference) packets in the transport stream. The PES must await alignment of the DTS with the recovered PCRB. This alignment takes place after the period of time that the value of the delay time S304 indicates, because the delay time S304 was added to the PCRB at the encoder, and this adjusted PCRB is used as the DTS entry.

At a turn-on initialization time, an initialization command S306 causes a selector 318 to transfer the stored time reference S303 into a new time stamp register 320. Each time a PES header is decoded in the input bit stream S4P, an offset number, stored in the frame rate (FR) register 308, is added to the new time stamp S308 by an adder 310. The result of this addition is returned to the new time stamp register 320 via selector 318.

The adder 310 offset number is specifically the number of cycles of 90 KHz contained in one frame time of the prevailing frame rate. The adder 310 offset numbers are shown in Table 1 (third column), and are automatically set as follows. A PES, sequence, pix and VBV delay decoder 302 detects a sequence start code in the input data stream S4P and produces a sequence detect signal S312. A frame rate decoder 304 extracts the four-bit Frame Rate Code S310 (first column of Table 1). The binary value of the frame rate code S310 corresponds to the frame rates listed in the second column of Table 1, as per the ATSC specification. A Look-Up-Table (LUT) 306 provides the offset number S311 (third column of Table 1) to frame rate register 308. In response to sequence detect signal S312, frame rate register 308 provides the stored offset number to adder 310. It should be noted that since PES streams can have a plurality of sequences of intermixed frame rates, the PTS-DTS retiming unit of the invention automatically calculates all of the time stamp updates.

TABLE 1

| FRAME RATE CODE IN SEQUENCE HEADER | FRAME RATE VALUE (Hz) | ADDER 310 OFFSET NUMBER |
| --- | --- | --- |
| 0001 | 24/1.001 (23.967...) | 3753.75 |
| 0010 | 24 | 3750 |
| 0011 | 25 | 3600 |
| 0100 | 30/1.001 (29.97...) | 3003 |
| 0101 | 30 | 3000 |
| 0110 | 50 | 1800 |
| 0111 | 60/1.001(59.94...) | 1501.5 |
| 1000 | 60 | 1500 |

The next step is to calculate the new PTS and DTS. DTS decode unit 328 decodes the DTS, if present, in the input data stream S4P to produce a DTS signal S321. DTS decode unit 328 also provides an indication flag S323 which is high (binary 1) if the input data stream S4P includes a DTS, and low (binary 0) if there is only a PTS (i.e., B-Frame operation). The DTS indication signal S323 is coupled to AND unit 334 and DTS update unit 340. The new DTS S327 is taken from the new time stamp register 320 only if the DTS flag S323 indicates the presence of a DTS in the input data stream S4P.

PTS decode unit 326 decodes the PTS in the input data stream S4P to produce a PTS signal S320. The difference S322 between the existing PTS S320 and DTS S321 is provided by subtractor 332 to AND unit 334. The new PT S326 is calculated by adding the subtractor 332 output number S322 to the number S308 stored in the new time stamp register 320. This operation takes place in adder 336. Notice that when there is no DTS present (i.e., DTS Flag=0), then the input S324 to adder 336 from AND unit 334 is zero (because of the operation of the AND unit 334) and new PTS S326 is the number S308 stored in the new time stamp register 320.

The new PTS S326 and the new DTS S327 are stored in respective update registers 338,340. A multiplex unit 344 inserts the new PTS S326 and DTS S327 values into the output data stream S7P in place of the old values. A controller 343 tracks the location of the appropriate bits in the outgoing data stream S7P, and causes the multiplex unit 344 to insert the updates in the correct positions in the stream. The outgoing data stream S7P proceeds to the transport stream encoder 150 in the usual manner.

The PTS-DTS retiming unit 300V also provides the ability to manage end-to-end delay in the system by accounting for buffer behavior in a far-end decoder (e.g., a set-top receiver) and buffer or bitstream generation behavior in the bitstream sources (e.g., encoder 210 and server 220), as will now be described.

PES, sequence, pix and VBV delay decoder 302 detects the start of a PES packet in the input data stream S4P and produces a PES detect signal S313 which is coupled to the new time stamp register 320. At each PES interval, the new time stamp register 320 is updated with a fixed constant S318 which is determined by the prevailing frame rate. The updated contents S308 of the new time stamp register 320 are compared with the contents S303 of the adjusted time reference register 316 by a comparator 323. The comparator result (i.e., less than, greater than, or equal to) provides an indication of the rate at which the PES data is being processed (i.e., too slowly, too quickly, or just right). If the PES streams S4P are being issued too slowly by, e.g., the live video encoder 210 or server 220, the encoder 210 or server 220 output buffers (not shown) may be read or emptied at a maximum rate. If the comparison indicates that processing is proceeding too quickly, the reading of the buffers in the encoders or servers can be halted or reduced. A buffer control signal S12 maybe used to control encoder 210 or server 220 buffer utilization.

One particular apparatus that uses the buffer control signal S12 is described in commonly assigned U.S. patent application Ser. No. 08/864,325, filed simultaneously herewith (Attorney Docket 12408) and incorporated herein by reference. In response to the flag, this apparatus adds or drops frames of information such that the number of bits is, respectively, increased or decreased.

Additionally, there is ordinarily a buffer (not shown) at the input to the TSE 150. If the TSE buffer is receiving data at too high a rate the TSE may supply a RECEIVER NOT READY signal S8 to the PTS-DTS retiming unit 300. The RECEIVER NOT READY signal S8 is coupled to a logic unit 325 at the output of comparator 323. The logic unit responsively generates a buffer control signal S12 which halts or reduces the bitrate generation of the encoders 210,220.

The above-described buffer control method exemplifies an important advantage in dealing with PES switching. The video PES data rate can be variable, as compared to the constant bitrate nature of transport stream switching, where stopping the transport bitstream is forbidden. Thus, the variable bitrate allows insertion of opportunistic data, as shown in FIGS. 1 and 2, which is not possible with constant bitrate data.

The PTS-DTS retiming unit of FIG. 3 has the ability to calculate the VBV delay number S316 and insert it (via multiplexer 344) into the 16 bit field within the Picture Header. The output of the PCRB serial to parallel converter 312 (i.e., the current time) is subtracted from the contents of the new time stamp register 320 in subtractor 322. PES, sequence, pix and VBV delay decoder 302 detects a picture header in the input data stream S4P and produces a pix detect signal S314 which is coupled to the VBV delay update register 324. In response to the pix detect signal S314, the VBV delay update register 324 stores the output S315 of subtractor 322. This stored number S316 represents the time, in 90 KHz cycles, that the picture will reside in the far-end decoder buffer, namely, the VBV delay parameter. Thus, the invention creates a ATSC-compliant bitstream without using the ATSC mode in which the VBV delay fields are set to hexadecimal FFFF.

Temporal reference in the Picture Header must also be adjusted to reflect the appropriate display order of the pictures in a group of pictures (GOP) as specified by the ATSC standard. When the input data stream S4P switches to a sequence header followed by a GOP Header, the temporal reference will be properly set to start at zero in the currently selected stream so that no adjustment is needed as the selected stream switches to another stream. However, if the GOP Header does not follow a sequence header then the new temporal reference value must be properly updated in the newly selected stream. The new temporal reference can be determined by monitoring the previously selected stream. New succeeding temporal reference values can be determined by monitoring the original value relationships on a frame by frame basis and updating the new temporal reference value with values that refer to the temporal reference value at the time the streams were switched. This technique will achieve the result of maintaining the display ordering of the temporal reference, even though the pictures are in transmission order.

VBV buffer fullness must also be monitored to properly control the flow of the video stream to the decoder. At initialization (i.e., initialization command S306 asserted), the number of bytes output from the PTS-DTS retiming unit 300V are stored on a frame by frame basis. The current time, decode time for each frame, the number of bytes per frame, and the VBV buffer size are used to determine the fullness of the VBV buffer.

At initialization the VBV buffer is empty. As the first frames are output to the VBV buffer, a running total of the bytes in the VBV buffer is maintained by a frame byte counter 354. If this total equals the VBV buffer size, an output signal S317 from the frame byte counter 354 to the logic unit 325 causes the logic unit 325 to prevent data from being output from the PTS-DTS retiming unit 300V.

Two modes of VBV buffer operation are possible as described in Annex C of the MPEG2 specification. The first mode (Mode A) requires VBV delay to be set to hexadecimal FFFF. The second mode (Mode B) requires the VBV delay to not be set to hexadecimal FFFF, but instead reflect the true value of VBV delay in the VBV buffer.

During Mode A initialization, bytes are output to the VBV buffer until the buffer is full as indicated by frame byte counter 354. Once the VBV buffer is full, data is extracted from the VBV buffer as described in Annex C of the MPEG2 specification.

During Mode B initialization, bytes are output to the VBV buffer until the calculated value of VBV delay is greater than or equal to the VBV delay value in the incoming stream S4P. The incoming stream should be self consistent and MPEG2 compliant in that the buffer will not over/under flow using the values contained in the stream. The calculated value of VBV buffer fullness contained in frame byte counter 354 is used to prevent under/over flow of the VBV buffer. Data flow to the VBV buffer can be regulated using this calculated value if the incoming stream for some reason is not consistent. The DTS - PTS values in the stream should be consistent with the VBV delay values contained in the stream.

When switching to a stream in Mode A, the hexadecimal FFFF value of VBV delay in the next-selected stream is overwritten with the calculated value maintained in the PTS-DTS retiming section. When switching to a stream in Mode B, the hex value of VBV delay in the next-selected stream is overwritten, when necessary, with the calculated value maintained in the PTS-DTS retiming section 300V until the calculated VBV buffer value and the next-selected stream VBV delay value are aligned. Otherwise the incoming stream data flow is held until the VBV delays align. This process takes advantage of the re-multiplexing operation that is occurring in the Transport Stream Encoder that follows the retiming circuit. During the alignment period, data may be output to the VBV buffer at maximum video bit rate, to increase the VBV delay in the VBV buffer. This process can continue until the VBV delays align as long as the buffer does not become full.

In steady state operation, a frame of data is removed from the VBV buffer when the current time matches the decode time stamp. The number of bytes in that frame are subtracted from the running total kept in the frame byte counter of the PTS-DTS retiming unit 300V. If the VBV buffer had been full, space has now been made for more data to be sent. If all of the end-to-end delay data had been in the VBV buffer, the frame exiting the VBV buffer at the decode time initiates the sending of the next frame.

When the VBV buffer has become full, prior to DTS of the first frame in the buffer minus the PCR base becoming equal to the VBV delay, the above-described VBV delay processing function operates by calculating a new VBV delay number and overwriting the VBV delay number present in the input stream S4P, thus maintaining MPEG-2 compliance. This method provides control of the VBV delay number on a frame by frame basis until such time as the VBV delay in stream S4P matches the calculated VBV delay in the decoder VBV buffer. A second (optional) VBV delay processing function may be implemented to provide finer control, thus allowing a smoother transition between the presently-selected stream and the next-selected stream.

The optional second VBV delay processing function may be incorporated into the PTS-DTS retiming unit 300 as follows. PES, sequence, pix and VBV delay decoder 302 detects the VBV delay parameter include within the PES picture header of input data stream S4P. The detected VBV delay S329 is coupled to a second comparator 327 and compared to the updated VBV delay number S315 produced by subtractor 322. The result of this comparison S330 is coupled to logic unit 325, where an additional calculation of decoder buffer utilization is performed. The additional calculation notes the size of the difference between the two VBV delays and, in response, acts in conjunction with the output of comparator 323 to generate the buffer control signal S12 for regulating data production in the video/audio encoders (for live bitstreams) or the servers (for stored bitstreams).

It must be noted that the VBV delay number present in the input stream was initially calculated by an encoder (not shown) to maintain the end to end delay of the system as controlled by the buffer at the decoder. By measuring the displacement of the VBV delay being produced by subtractor 322 and the VBV delay used in the presently selected stream S4P, the logic unit 325 can modulate buffer control signal S12 more precisely. The buffer control signal S12, as previously discussed, may be used to speed up or slow down the data rate of a bitstream source.

Figure 7:
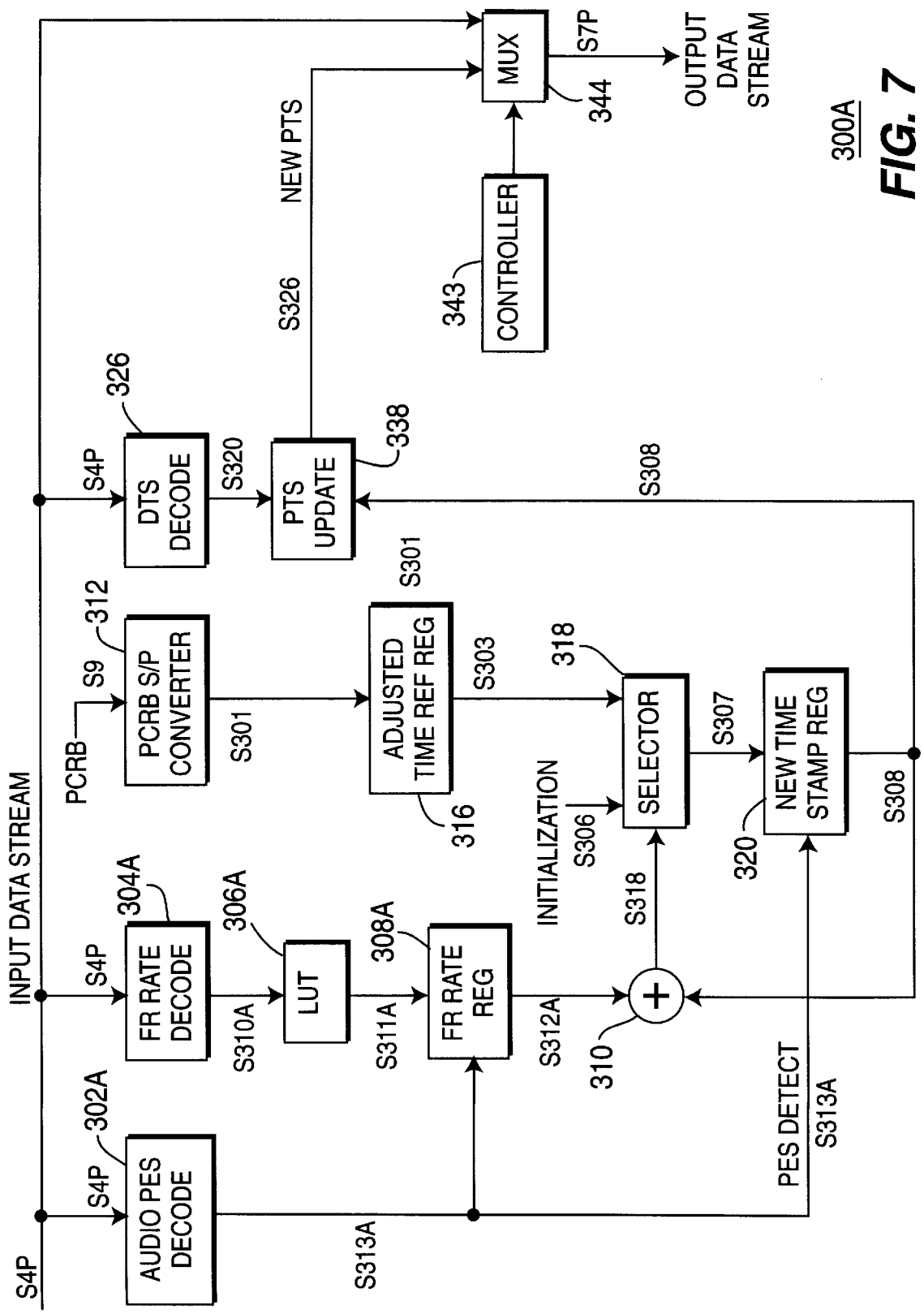
FIG. 7 shows a block diagram of an audio PTS retiming system suitable for use in retiming systems of FIG. 1 and FIG. 2.

FIG. 7 shows a block diagram of an audio PTS retiming system 300A suitable for use in retiming systems of FIG. 1 and FIG. 2. The audio PTS retiming unit 300A is essentially a functional subset of the video PTS-DTS retiming unit 300V, described above with respect to FIG. 3. As such, only the differences between the video unit 300V and the audio unit 300A will be discussed. It should be noted that the audio PTS retiming system 300A does not include the VBV management structure shown in the video PTS-DTS retiming system 300V of FIG. 3.

The audio PTS retiming unit 300A receives a PES input bitstream S4P from a PES switcher 230 (PES layer retiming system 200) or a PES demultiplexer 137 (transport layer retiming system 100) and delivers a PES output bitstream S7P to a TSE 150. The TSE performs the PCR stamping at its output. The TSE feeds back a synchronized PCR base reference at a 90 KHz rate (the station clock of 27 DMz divided by 300). The PTS-DTS retiming unit operates as follows.

At a turn-on initialization time, an initialization command S306 causes a selector 318 to transfer the stored time reference S303 into a new time stamp register 320. Each time an audio PES is decoded in the input bit stream S4P, an offset number, stored in the frame rate (FR) register 308A, is added to the new time stamp S308A by an adder 310. The result of this addition is returned to the new time stamp register 320 via selector 318.

An audio PES decoder 302A detects an audio PES start code in the input data stream S4P and produces an audio PES detect signal S312. A frame rate decoder 304 extracts a four-bit Frame Rate Code S310. A Look-Up-Table (LUT) 306A provides an offset number S311A to frame rate register 308A. In response to audio PES detect signal S312A, frame rate register 308A provides the stored offset number to adder 310. Additionally, audio PES detect signal S312 is coupled to a new time stamp register 320. At each PES interval, the new time stamp register 320 is updated with a fixed constant S318 which is determined by the prevailing frame rate.

PTS decode unit 326 decodes the PTS in the input data stream S4P to produce a PTS signal S320. The decoded PTS indicates that the number S308 stored in the new time stamp register 320 should be coupled to a multiplex unit 244 as a new PTS S326. A controller 343 tracks the location of the appropriate bits in the outgoing data stream S7P, and causes the multiplex unit 344 to insert the updates in the correct positions in the stream. The outgoing data stream S7P proceeds to the transport stream encoder 150 in the usual manner.

FIG. 4 shows a block diagram of a receiver/decoder system 400 which may be used in, e.g., a "far end decoder" or home ATSC television system. The transport stream decoder (TSD) 405 decodes an input transport stream (from, e.g., a direct broadcast system) in the usual manner to produce a PES data stream and to also provide PCR and PCRB data to a PES decoder 415. Decoder 415 decodes the audio and video PES streams in the usual manner to generate an output signal which may be coupled to an appropriate audio/video system (not shown) for audio and video reproduction. The system of FIG. 4 does not provide for switching to a recorded sequence (e.g., video disk, CD, computer storage device and the like).

FIG. 5 shows a block diagram of a home receiver/decoder system 500, such as the system 400 shown in FIG. 4, and including improvements according to the invention. To accommodate switching to a recorded sequence, the system 500 of FIG. 5 includes bitstream server 520, illustratively a home recorder tape server, which stores program material in a PES format. As previously discussed with respect to FIG. 2, PES storage is more efficient than transport stream storage due to the avoidance of storing transport stream overhead.

TSD 505 operates in substantially the same manner as the TSD 405 of FIG. 4. Moreover, PES switcher 530 and server 520 operate in substantially the same manner as, respectively, PES switcher 230 and PES server 220 of FIG. 2. Also, PTS-DTS retiming unit 300 operates in substantially same manner as PTS-DTS retiming unit 300 of FIGS. 2 and 3.

A buffer (not shown) to allow flow control (to maintain proper PES decoder buffer fullness) can be included in recorder/server 520 or in PES switcher 530. By locking the PTS-DTS retiming unit 300 to the transport decoder PCRB signals insures smooth switching between off-air and recorded bitstreams. In the absence of off-air signals, the PTS-DTS retiming unit 300 operates from a free-running PCR timing source, such as a voltage controlled crystal oscillator (VCXO) within the Transport Decoder.

Figure 6:
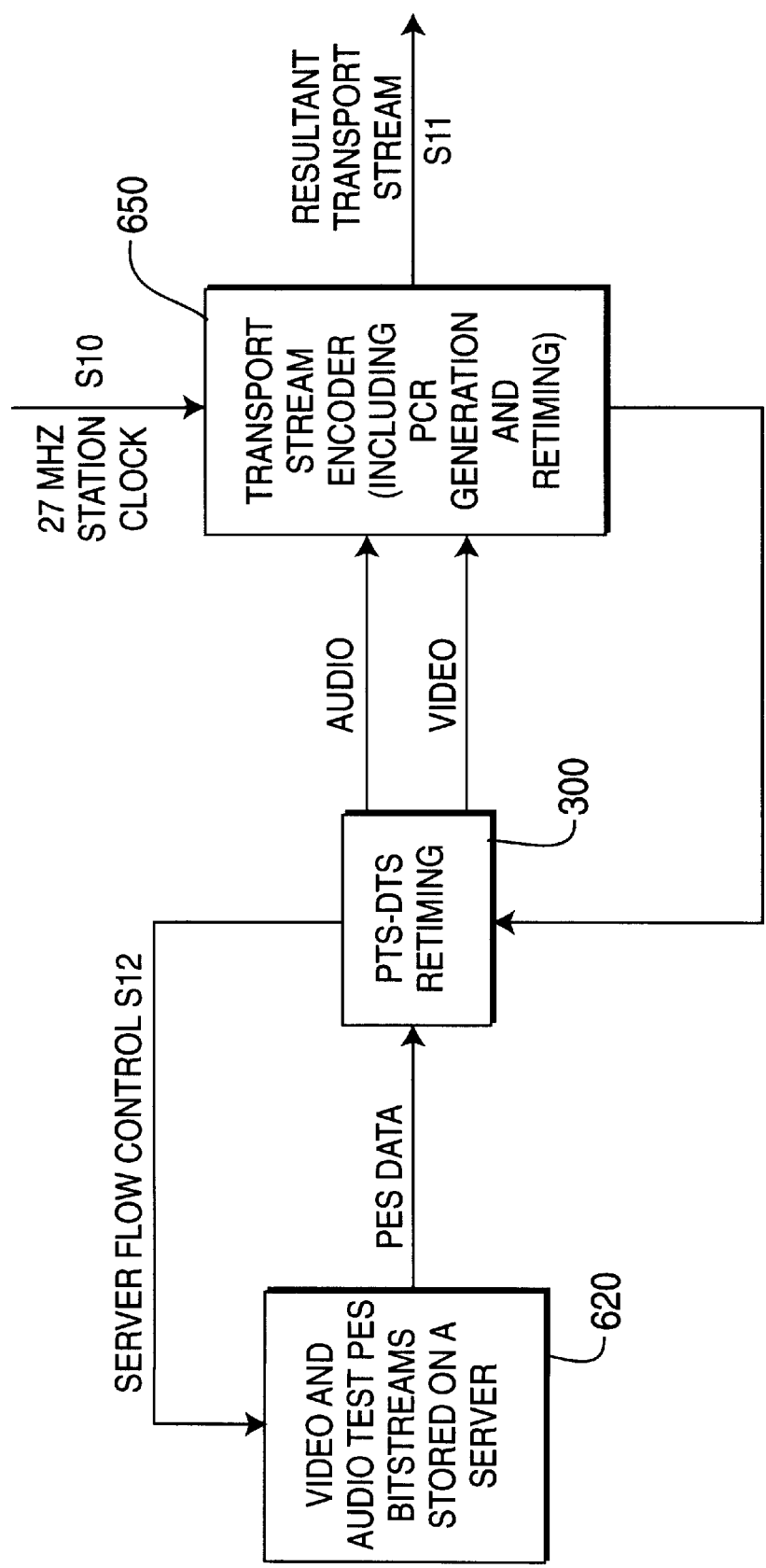
FIG. 6 shows a block diagram of a bitstream generator according to the invention.

FIG. 6 shows a block diagram of a bitstream generator 600 according to the invention. The bitstream generator includes a bitstream server 620 which stores, e.g., audio and video test streams in PES format. The stored PES data is coupled to a PTS-DTS retiming unit 300 which operates in substantially same manner as PTS-DTS retiming unit 300 of FIGS. 2 and 3. The retiming unit 300 produces a continuously looping audio and/or video bitstream which is coupled to a TSE 650. TSE 650 operates in substantially the same manner as TSE 250 of the system 200 of FIG. 2 to produce a resultant transport stream S11.

The continuously looping bitstream system of FIG. 6 addresses a problem similar to that which is addressed by, e.g., the system 200 of FIG. 2, namely the seamless joining together of two bitstreams having unrelated timing information. In the previously described cases of switching between two bitstreams, the bitstreams are from different sources. In the bitstream generator scenario case, the "switching" is from the end of a bitstream to the beginning of the same bitstream. Thus, the timing information of the "two" (i.e., beginning and end) bitstreams is not synchronized and TSE 650 would possibly produce a non-compliant transport stream without the retiming of the second (i.e., beginning) bitstream.

Another application of the invention is in the use of Interactive Digital Video Disc (DVD) servers. If bitstreams are recorded as PES streams on Digital Video Discs, then interactive frame switching on the disc is possible using the retiming methods described. For example, in a DVD-based interactive game a user may select one of a number of possible actions (e.g., open a door, pick up a weapon, converse with someone or something, etc.), each of the actions requiring the playing of a different audio/video sequence. These sequences are stored on the DVD with predetermined timing information which may need to be retimed when switching from one stored sequence to another.

The above-described embodiments of the invention illustrate the method used by the invention performing various operations on, e.g., compressed ATSC transport and PES bitstreams while maintaining compliance with the relevant standards. This method regulates flow control, such that buffer overflow or buffer underflow may be avoided in a straightforward manner. The invention also provides a way to exit a bitstream in multiple places, not simply the predefined splice points described in the ATSC standard (referring to the MPEG standard). It must be noted that a stream should be entered at, e.g., an I-frame or anchor frame.

Although various embodiments which incorporate the teachings of the present invention have been shown and described in detail herein, those skilled in the art can readily devise many other varied embodiments that still incorporate these teachings. The invention has broad applicability.

For example, the invention is useful in studios to perform splicing between different services which are not locked. The invention allows home (i.e., consumer) recorders to create high quality splices; avoiding waviness, blue-fields and other non-studio quality artifacts. The invention allows switching from, e.g., a television picture to a VCR picture w/o disruption in image quality.

The invention is useful for any data stream, such as auxiliary or control data, which may be transmitted or stored in any storage medium and remultiplexed back into the bitstream. For example, if broadcasters wish to sell excess capacity in a datastream to a data delivery service (e.g., "pointcast" information service, program guides, assorted telecom services and the like) then the broadcaster will need to easily manipulate the data streams. The invention provides a tool to accomplish this manipulation.

These and other embodiments are intended to be within the scope of the following claims.

What is claimed is:

1. A time base correction method comprising the steps of:
   (A) receiving an information stream, said received information stream comprising a compressed video stream having a plurality of timing portions and associated payload portions, said timing portions being necessary for decoding said associated payload portions to produce a video program at a decoder;
   (B) decoding a timing portion including a presentation time stamp of said information stream;
   (C) determining a duration parameter of a payload portion associated with said decoded timing portion;
   (D) modifying said decoded presentation time stamp using said duration parameter to form a new presentation time stamp;
   (E) recoding said timing portion including said new presentation time stamp of said information stream; and
   (F) repeating steps (B) through (D) for each of said plurality of timing portions and associated payload portions of said received information stream to produce an output information stream, said output information stream comprising said compressed video stream, said compressed video stream including modified timing portions.

2. The method of claim 1 wherein:
   step (C) further comprises the step of determining a size parameter of said payload portion associated with said decoded timing portion; and
   step (D) further comprises the steps of:
      comparing said duration parameter to a decode buffer utilization parameter; and
      responsively reducing a rate of receiving said information stream if said comparison indicates that said decode buffer utilization exceeds a predetermined threshold level.

3. The method of claim 2 wherein:
   step (D) further comprises the step of:
      responsively increasing a rate of receiving said information stream if said comparison indicates that said decode buffer utilization is less than a predetermined threshold level.

4. The method of claim 1 wherein:
   step (C) further comprises the step of determining a size parameter of said payload portion associated with said decoded timing portion; and
   step (D) further comprises the steps of:
      comparing said duration parameter to a decode buffer utilization parameter; and
      responsively reducing a rate of receiving said information stream if said comparison indicates that said decode buffer utilization exceeds a predetermined threshold level.

5. A method for retiming a bitstream, said bitstream comprising timing portions and respective compressed payload portions, said method comprising the steps of:

generating a local time stamp in response to a local timing signal;

retrieving a presentation time stamp from said timing portions of said bitstream;

adding time stamp to produce a new presentation time stamp; and inserting said new presentation time stamp into said bitstream to produce a retimed bitstream, said retimed bitstream comprising retimed portions and respective compressed payload portions.

6. The method of claim 5 further comprising the steps of:

retrieving a decode time stamp from said timing portions of said bitstream;

subtracting said retrieved decode time stamp from said new presentation time stamp; and inserting said generated time stamp into said bitstream as new decode time stamp.

7. The method of claim 5, wherein said generating step comprises the steps of:

adding a delay parameter to said local timing source signal to produce an adjusted timing signal; and storing said adjusted timing signal in response to a control signal representative of the start of an information packet in said bitstream.

8. The method of claim 7, further comprising the steps of:

producing a buffer control signal, said buffer control signal indicative of a desired flow of data in said bitstream;

comparing said adjusted timing signal to said stored timing signal; and in the case of said adjusted timing signal exceeding said stored timing signal, causing said buffer control signal to indicate that said desired flow is reduced;

in the case of said stored timing signal exceeding said adjusted timing signal, causing said buffer control signal to indicate that said desired flow is increased.

9. The method of claim 7, further comprising the steps of:

producing a buffer control signal, said buffer control signal indicative of a desired flow of data in said bitstream;

subtracting said generated time stamp from said adjusted timing signal to produce a first difference signal;

comparing said first difference signal to a buffer delay parameter associated with said bitstream; and in the case of said first difference signal exceeding said buffer delay parameter associated with said bitstream, causing said buffer control signal to indicate that said desired flow is increased;

in the case of said buffer delay parameter associated with said bitstream exceeding said first difference signal, causing said buffer control signal to indicate that said desired flow is decreased.

10. The method of claim 7, further comprising the steps of:

producing a buffer control signal, said buffer control signal indicative of a desired flow of data in said bitstream;

monitoring an indicium of the number of bytes in a decoder buffer; and in the case of said number of bytes in said decoder buffer exceeding a predetermined maximum amount, causing said buffer control signal to indicate that said desired flow is decreased;

in the case of said number of bytes in said decoder buffer being below a predetermined minimum amount, causing said buffer control signal to indicate that said desired flow is increased.

11. Apparatus suitable for retiming a bitstream in response to a local timing source, said bitstream comprising timing portions and respective encoded payload portions said timing portion being useful in decoding respective payload portions, said apparatus comprising:

a time stamp generator, responsive to a timing signal, for generating a time stamp;

a first decoder for retrieving a presentation time stamp from said timing portions of said bitstream;

an adder for adding said generated time stamp to said retrieved presentation time stamp to produce a new presentation time stamp; and a multiplexer, coupled to said adder, for inserting said new presentation time stamp into said bitstream to produce a retimed bitstream, said retimed bitstream comprising retimed timing portions and respective encoded payload portions.

12. The apparatus of claim 11 further comprising:

a second decoder for retrieving a decode time stamp from said timing portions of said bitstream; and a subtractor for subtracting said retrieved decode time stamp from said new presentation time stamp;

said multiplexer inserting said generated time stamp into said bitstream as a new decode time stamp.

13. The apparatus of claim 11, wherein:

said time stamp generator comprises:

an adder, for adding a delay parameter to said timing signal, to produce an adjusted timing signal; and a storage element for storing said adjusted timing signal in response to a control signal representative of the start of an information packet in said bitstream.

14. The apparatus of claim 13 further comprising:

a logic unit for producing a buffer control signal, said buffer control signal indicative of a desired flow of data in said bitstream; and a first comparator, coupled to said time stamp generator and said logic unit, for comparing said adjusted timing signal to said stored adjusted timing signal and responsively producing an output signal;

said logic unit, in response to said first comparator output signal indicating that said adjusted timing signal exceeds said stored adjusted timing signal, causing said buffer control signal to indicate that said desired flow is reduced; and said logic unit, in response to said first comparator output signal indicating that said stored adjusted timing signal exceeds said adjusted timing signal, causing said buffer control signal to indicate that said desired flow is increased.

15. The apparatus of claim 13 further comprising:

a logic unit for producing a buffer control signal, said buffer control signal indicative of a desired flow of data in said bitstream;

a second subtractor, coupled to said timing generator and said timing source, for subtracting said generated time stamp from said adjusted timing signal to produce a first difference signal; and a second comparator, coupled to said second subtractor and said logic unit, for comparing said first difference signal to a buffer delay parameter associated with said bitstream;

said logic unit, in response to said second comparator output signal indicating that said first difference signal exceeds said buffer delay parameter associated with said bitstream, causing said buffer control signal to indicate that said desired flow is increased;

said logic unit, in response to said second comparator output signal indicating that said buffer delay parameter associated with said bitstream exceeds said first difference signal, causing said buffer control signal to indicate that said desired flow is decreased.

16. The apparatus of claim 13 further comprising:

a logic unit for producing a buffer control signal, said buffer control signal indicative of a desired flow of data in said bitstream; and a frame byte counter, coupled to said logic unit, for counting a number of bytes stored in a decoder buffer;

said logic unit, in response to said number of bytes stored in said decoder buffer exceeding a predetermined maximum amount, causing said buffer control signal to indicate that said desired flow is decreased;

said logic unit, in response to said number of bytes stored in said decoder buffer being below a predetermined minimum amount, causing said buffer control signal to indicate that said desired flow is increased.

17. The apparatus of claim 11 wherein said output bitstream comprises a packetized elementary stream and said apparatus further comprises:

a transport stream encoder, coupled to said multiplexer output, for transport encoding said output bitstream to produce a transport encoded bitstream.

18. The apparatus of claim 17 wherein said transport stream encoder receives a second bitstream from a second bitstream source, and said transport encoded bitstream comprises at least said output bitstream from said multiplexer and said second bitstream.

19. The apparatus of claim 14 further comprising:

a frame byte counter, coupled to said logic unit, for counting a number of bytes stored in a decoder buffer;

said logic unit, in response to said number of bytes stored in said decoder buffer exceeding a predetermined maximum amount, causing said buffer control signal to indicate that said desired flow is decreased; and said logic unit, in response to said number of bytes stored in said decoder buffer being below a predetermined minimum amount, causing said buffer control signal to indicate that said desired flow is increased.

20. The apparatus of claim 15 further comprising:

a frame byte counter, coupled to said logic unit, for counting a number of bytes stored in a decoder buffer;

said logic unit, in response to said number of bytes stored in said decoder buffer exceeding a predetermined maximum amount, causing said buffer control signal to indicate that said desired flow is decreased; and said logic unit, in response to said number of bytes stored in said decoder buffer being below a predetermined minimum amount, causing said buffer control signal to indicate that said desired flow is increased.

21. The apparatus of claim 13 wherein said output bitstream comprises a packetized elementary stream and said apparatus further comprises:

a transport stream encoder, coupled to said multiplexer output, for transport encoding said output bitstream to produce a transport encoded bitstream.

* * * * *